US012002298B2

United States Patent
Lhommeau et al.

(10) Patent No.: US 12,002,298 B2
(45) Date of Patent: Jun. 4, 2024

(54) SYSTEM FOR VERIFYING TURBOJET ENGINE PARTS USING RADIO FREQUENCY IDENTIFICATION, COMPRISING AN INTEGRATED ANTENNA

(71) Applicant: SAFRAN AIRCRAFT ENGINES, Paris (FR)

(72) Inventors: Tony Alain Roger Joel Lhommeau, Moissy-Cramayel (FR); Guillaume Philippe Camille Bastard, Moissy-Cramayel (FR); Hervé Jean Albert Mouton, Moissy-Cramayel (FR); Philippe Roger Jacques Canteau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 674 days.

(21) Appl. No.: 17/264,074

(22) PCT Filed: Jul. 24, 2019

(86) PCT No.: PCT/FR2019/051833
§ 371 (c)(1),
(2) Date: Jan. 28, 2021

(87) PCT Pub. No.: WO2020/025881
PCT Pub. Date: Feb. 6, 2020

(65) Prior Publication Data
US 2021/0375071 A1    Dec. 2, 2021

(30) Foreign Application Priority Data
Jul. 31, 2018 (FR) ...................................... 18 57170

(51) Int. Cl.
*G07C 5/00*       (2006.01)
*B64C 7/02*       (2006.01)
(Continued)

(52) U.S. Cl.
CPC ................ *G07C 5/006* (2013.01); *B64C 7/02* (2013.01); *G06K 17/0022* (2013.01); *G08G 5/0004* (2013.01)

(58) Field of Classification Search
CPC ....... G07C 5/006; B06K 7/02; G06K 17/0022
See application file for complete search history.

(56) References Cited

U.S. PATENT DOCUMENTS 7,368,827 B2 *  5/2008  Kulkarni ................. F01D 15/10
                                                        290/52
8,004,423 B2 *  8/2011  Mitchell ............... F01D 21/003
                                                        73/754
(Continued)

FOREIGN PATENT DOCUMENTS

EP    3 196 425 A1    7/2017
FR    3 053 958 A1    1/2018

OTHER PUBLICATIONS

International Search Report dated Jan. 15, 2020 in PCT/FR2019/051833 filed on Jul. 24, 2019, 3 pages
(Continued)

*Primary Examiner* — Omeed Alizada
(74) *Attorney, Agent, or Firm* — Oblon, McClelland, Maier & Neustadt, L.L.P.

(57) ABSTRACT

A system for aircraft maintenance is disclosed, such as for monitoring parts mounted in a turbojet engine, the turbojet engine being accommodated in a nacelle compartment delimited by a nacelle wall. The system can verify parts, each of the parts being equipped with an RFID tag. The verification system includes an inner antenna accommodated in the nacelle compartment, the inner antenna being arranged to allow the exchange of radio frequency signals with each RFID tag, an interface device including an access point located outside the nacelle compartment, the interface device being arranged to be able to be connected to an
(Continued)

interrogator device arranged to communicate with the RFID tag, and a transmission line connecting the interface device to the inner antenna.

12 Claims, 2 Drawing Sheets

(51) Int. Cl.
*G06K 17/00* (2006.01)
*G08G 5/00* (2006.01)

(56) References Cited

U.S. PATENT DOCUMENTS

| | | | | |
|---|---|---|---|---|
| 8,229,605 | B2* | 7/2012 | Vlad | H01Q 1/42 |
| | | | | 343/705 |
| 8,662,746 | B2* | 3/2014 | Subramanian | G01K 7/04 |
| | | | | 374/137 |
| 9,350,319 | B2* | 5/2016 | Mitchell | F01D 17/02 |
| 9,972,896 | B2* | 5/2018 | Bulumulla | G07C 5/008 |
| 10,371,588 | B2* | 8/2019 | Gregory | G01L 1/2293 |
| 11,371,383 | B2* | 6/2022 | Lhommeau | G06K 7/10346 |
| 11,448,085 | B2* | 9/2022 | Guler | G01K 13/08 |
| 2005/0198967 | A1* | 9/2005 | Subramanian | C23C 24/04 |
| | | | | 60/803 |
| 2007/0114280 | A1 | 5/2007 | Coop et al. | |
| 2008/0125950 | A1 | 5/2008 | Brown | |
| 2010/0226757 | A1* | 9/2010 | Mitchell | F01D 21/14 |
| | | | | 415/118 |
| 2011/0280279 | A1 | 11/2011 | Gregory et al. | |
| 2013/0125386 | A1 | 5/2013 | Gregory et al. | |
| 2014/0291397 | A1 | 10/2014 | Caputo et al. | |
| 2016/0092640 | A1 | 3/2016 | Caputo et al. | |
| 2016/0343276 | A1* | 11/2016 | Epherre-Iriart | G06Q 10/06 |
| 2017/0369188 | A1 | 12/2017 | Bulumulla et al. | |
| 2018/0114599 | A1 | 4/2018 | Caputo et al. | |
| 2019/0252069 | A1 | 8/2019 | Caputo et al. | |

OTHER PUBLICATIONS

Preliminary French Search Report dated May 29, 2019 in French Application No. 18 57170 filed on Jul. 31, 2018 (with Translation of Category of Cited Documents), 2 pages

* cited by examiner

SYSTEM FOR VERIFYING TURBOJET ENGINE PARTS USING RADIO FREQUENCY IDENTIFICATION, COMPRISING AN INTEGRATED ANTENNA

TECHNICAL FIELD

The invention pertains to the field of aircraft maintenance, more particularly the field of monitoring parts mounted in a turbojet engine. It relates to a system for verifying turbojet engine parts wherein the verification is carried out by means of an interrogator device arranged to be able to communicate with RFID tags associated with said parts. The invention also relates to a verification assembly comprising such a verification system, at least an RFID tag and an interrogator device. Last, the invention relates to an aircraft turbojet engine comprising the verification system, at least an RFID tag and an interrogator device.

PRIOR ART

Aircraft maintenance in certain situations involves identifying the parts equipping a turbojet engine. This identification is based on information relating to the parts such as the manufacturer's name, the serial number, the part number or the date of installation of the part. Conventionally, this information accompanies the parts that equip a turbojet engine by engraving on these parts or by fastening an identification plate on to them. After integrating the parts in the turbojet engine, reading the information can prove difficult or even impossible without the disassembly of these parts or of the surrounding parts. Furthermore, the turbojet engine parts are accommodated within a nacelle and are only accessible after opening a cowl. Strict regulations surround the interventions on a turbojet engine and in particular the opening of these nacelle cowls. It is in particular necessary to follow a specific protocol negatively impacting the duration of the intervention. Moreover, the opening of the nacelle cowls can be prevented by strong winds, making it impossible to identify the parts.

A solution allowing information relating to the parts equipping a turbojet engine to be accessed without having to open any nacelle cowls consists in equipping the parts with RFID tags containing this information. The passage of a reader interrogator in the vicinity of the RFID tags allows the information to be collected. The data exchange is achieved by means of electromagnetic waves at frequencies ranging between approximately 100 kHz (kilohertz) and a few gigahertz. A radiofrequency interrogation signal is first emitted by the reader interrogator to each of the RFID tags. Each RFID tag located in a vicinity close enough to the reader interrogator to receive the radiofrequency interrogation signal re-emits to the reader interrogator a radiofrequency response signal containing the information contained in a chip of the RFID tag. This solution based on radio-identification allows the information associated with a plurality of turbojet engine parts to be easily and quickly accessed, including when these parts are surrounded by other parts in a dense environment. It is in particular described in patent application EP 3 196 425 A1 as a solution for communicating information concerning an oil level in a turbojet engine with a mobile apparatus external to the aircraft. Nevertheless, the exchange of electromagnetic signals between turbojet engine parts and the outside is highly disrupted by the wall of the nacelle enveloping the turbojet engine. This wall is generally composed of a multilayer structure at least partially electrically conductive. It is for example formed by a first composite carbon layer, a second honeycomb layer, a third composite carbon layer and a fourth bronze mesh layer. The wall of the nacelle thus, forms a Faraday cage with an attenuation of an order of 40 to 80 dB. This electromagnetic barrier could possibly be crossed by highly increasing the strength of the signals exchanged between the reader interrogator and the RFID chips. However, this strength must be limited due to the risk of interferences with other equipment of the aircraft or even with the equipment of other aircrafts.

In view of the above, the purpose of the invention is to provide a solution allowing turbojet engine parts to be easily identified and possibly extra information to be obtained relating to these parts without having to dismount part of the turbojet engine and even without having to open a nacelle cowl. The other purpose of the invention is to provide a system the design, manufacturing and maintenance costs of which are compatible with a use on an industrial scale.

SUMMARY OF THE INVENTION

To this end, the invention is based on radio-identification technology, also called RFID technology (radio frequency identification). It proposes to integrate to the nacelle wherein the turbojet engine is accommodated radiofrequency linking elements allowing radiofrequency signals to be relayed between the inside of the nacelle and its external environment without having to open the nacelle cowl.

More specifically, the purpose of the invention is a system for verifying turbojet engine parts, the turbojet engine being accommodated in a nacelle compartment delimited by a nacelle wall and including at least one part equipped with an RFID tag. The verification system comprises:
- an inner antenna accommodated in the nacelle compartment, the inner antenna being arranged to allow the exchange of radiofrequency signals with the RFID tag,
- an interface device including an access point located outside the nacelle compartment, the interface device being arranged to be able to be connected to an interrogator device arranged to communicate with the RFID tag, and
- a transmission line connecting the interface device to the inner antenna.

The communication between an interrogator device, also called «RFID reader», and an RFID tag conventionally involves the transmission, from the interrogator device to the RFID tag, of a radiofrequency interrogation signal and the transmission, from the RFID tag to the interrogator device, of a radiofrequency response signal encoding information contained in an electronic chip of the RFID tag. The radiofrequency signals have for example frequencies in a range comprised between 860 MHz (megahertz) and 960 MHz. The RFID technology can be passive, active or semi-active. A passive technology RFID tag is only powered by the electromagnetic signal emitted by the interrogator device. This signal allows at the same time to power the RFID tag and to transmit a request for sending information contained in an electronic chip of the RFID tag to it. An active technology RFID tag is equipped or associated to a battery allowing it to provide the energy necessary for sending a signal containing the information of the electronic chip. A semi-active technology RFID tag is also equipped or associated to a battery; nevertheless, the energy provided by the battery is only used for storing information in the electronic chip, and not for emitting the signal containing this information.

It is worth noting that the system for verifying parts is adapted to the simultaneous verification of a plurality of parts each equipped with an RFID tag. In order to limit the risks of collision between the radiofrequency response signals emitted by several RFID tags, the verification system can integrate a collision management mechanism. This mechanism consists for example in a collision management algorithm integrated within the interrogator device.

The inner antenna is for example mounted on an inner surface of the nacelle wall. It can also be mounted on a turbojet engine casing. It can be of any type as long as it is adapted to radiofrequency signals that are compatible with the RFID technology. It consists for example of an omni-directional antenna, a quarter-wave antenna, a dipole antenna, a ground-plane antenna, a parabolic antenna or a four-quad antenna. In a particular embodiment, the inner antenna is arranged to emit and receive radiofrequency signals in a range of frequencies comprised between 860 MHz and 960 MHz.

According to a first alternative embodiment, the access point of the interface device comprises a coaxial connector. This coaxial connector is accessible from the outside of the nacelle compartment. It is for example mounted on the outer surface of the nacelle wall or in the thickness of the nacelle wall. The coaxial connector is for example a BNC connector.

According to a second alternative embodiment, the access point of the interface device comprises an outer antenna. This outer antenna is located outside the nacelle compartment. It is for example mounted on the outer surface of the nacelle wall. The outer antenna can be of any type, as long as it is adapted to radiofrequency signals compatible with the RFID technology. It consists for example of an omni-directional antenna, of a quarter-wave antenna, a dipole antenna, a ground-plane antenna, a parabolic antenna or a quadriquad antenna. In a particular embodiment, the outer antenna is arranged to emit and receive radiofrequency signals in a range of UHF frequencies comprised between 860 MHz and 960 MHz. In order to limit the aerodynamic disruptions during the flight of the aircraft, the outer antenna can be integrated in a casing having an aerodynamic form mounted on the outer surface of the nacelle wall. The casing has for example a shark fin form.

It is worth noting that the interface device can include a plurality of access points. Furthermore, the first and second alternative embodiments are perfectly compatible. The interface device can include at the same time one or several coaxial connectors as well as one or several outer antennas. In a particular embodiment, the interface device includes a coaxial connector and an outer antenna. The connection between an interrogator device and the inner antenna can thus be achieved by a wire connection or a wireless connection.

The interface device can further include a conversion unit connected between the outer antenna and the inner antenna and arranged to convert a signal in a first communication protocol into a signal in a second communication protocol, and conversely, the first communication protocol being compatible with the interrogator device and the second communication protocol being compatible with the RFID tag. In particular, the conversion unit can be arranged to convert, on the one hand, a radiofrequency interrogation signal emitted by the interrogator device in the first communication protocol into a radiofrequency interrogation signal in the second communication protocol, and on the other hand, a radiofrequency response signal emitted by the RFID tag in the second communication protocol into a radiofrequency response signal in the first interrogation protocol. Generally speaking, the second communication protocol is an RFID communication protocol. The first communication protocol can in particular be a Wi-Fi protocol, a Bluetooth protocol, a Zigbee protocol or a proprietary protocol.

The verification system can further include a relay antenna, installed on the ground, arranged to transmit radiofrequency signals originating from an interrogator device to the outer antenna of the interface device, and reciprocally. The verification system can include a plurality of relay antennas, each relay antenna being advantageously located in the vicinity of a parking area of an aircraft, in the vicinity of an aircraft hangar or inside such a hangar. A same interrogator device can thus be used to interrogate, from a unique location, or from a limited number of locations, a plurality of turbojet engines equipping different aircrafts.

According to a particular embodiment, the interface device further includes a bidirectional repeater amplifier connected between the outer antenna and the inner antenna. In the case of a plurality of inner antennas, the repeater amplifier can be connected at a common branch of the transmission lines, such as to amplify the signals passing through all the transmission lines. The repeater amplifier is advantageously arranged, on the one hand, to receive a radiofrequency interrogation signal emitted by the interrogator device, amplify it and send it to the inner antenna and, on the other hand, to receive a radiofrequency response signal emitted by the RFID tag, to amplify it and send it to the outer antenna.

According to another particular embodiment, the interface device, further includes an authorisation module arranged to receive engine status information relative to the switched on or switched off state of the turbojet engine and prevent or authorise the emission of a radiofrequency interrogation signal by the inner antenna according to said engine status information. This embodiment is in particular appropriate for the second alternative embodiment, wherein the access point includes an outer antenna liable to receive a radiofrequency interrogation signal while the turbojet engine is in operation. The transmission of this radiofrequency signal in the nacelle compartment risks disrupting certain signals circulating inside the turbojet engine and participating in its regulation. For the first alternative embodiment, wherein the access point incudes a coaxial connector, the risk of emission of a radiofrequency interrogation signal is already limited by regulations which prohibit an operator from getting close to a turbojet engine in operation. Nevertheless, an authorisation module can be provided in order to ensure additional security. The switched on or off state of the turbojet engine corresponds for example to a rotational speed of the turbojet engine, the turbojet engine being considered as switched off when its rotational speed is null and being considered as switched on when its rotational speed is non null. The engine status information can be emitted by a controlling system of the aircraft, for example a central controlling system or a full authority digital engine control (FADEC).

The RFID tag can contain information relative to an identification of the part that it equips, information relative to a lifetime of said part and/or information relative to the presence of a predetermined substance in said part. The RFID tag can in particular contain a serial number, a product number, an indication relative to the manufacturer, an estimated lifetime of the part, a scheduled replacement date of the part and/or information relative to the presence of a dangerous or toxic substance.

The nacelle wall typically includes a fan cowl and a core cowl. The access point of the interface device can thus be mounted on the fan cowl or the core cowl. More particularly, it can be mounted on an outer surface of the fan cowl or the core cowl.

The verification system can include a plurality of inner antennas accommodated in the nacelle compartment and a plurality of transmission lines, the transmission lines connecting the interface device to each inner antenna. The inner antennas are preferably located in different positions inside the nacelle compartment. Each inner antenna is connected to at least one access point by a transmission line. Preferably, each inner antenna is connected to the assembly of access points. Thus, from a same access point, RFID tags located in different positions of the turbojet engine can be interrogated.

Each transmission line ensures the electric connection between an access point and an inner antenna. Several transmission lines can include a common section in order to limit their total length and hence the weight of the verification system. In particular, a common section can be provided to cross the nacelle wall. In a particular embodiment, each transmission line comprises a coaxial cable. Preferably, the coaxial cable is reinforced.

The invention also relates to an assembly for verifying turbojet engine parts comprising the system for verifying parts such as described previously, one or several RFID tags each capable of equipping a part of a turbojet engine and an interrogator device arranged to communicate with the RFID tags via the verification system.

The invention further relates to an aircraft turbojet engine arranged to be accommodated in a nacelle compartment delimited by a nacelle wall and comprising the system for verifying parts such as described previously and one or several RFID tags each equipping a turbojet engine part.

BRIEF DESCRIPTION OF THE DRAWINGS

Other features, details and advantages of the invention will become apparent from the reading of the following description, given only by way of example and made in reference to the accompanying drawings for which.

DETAILED DESCRIPTION OF SPECIFIC EMBODIMENTS

Figure 1:
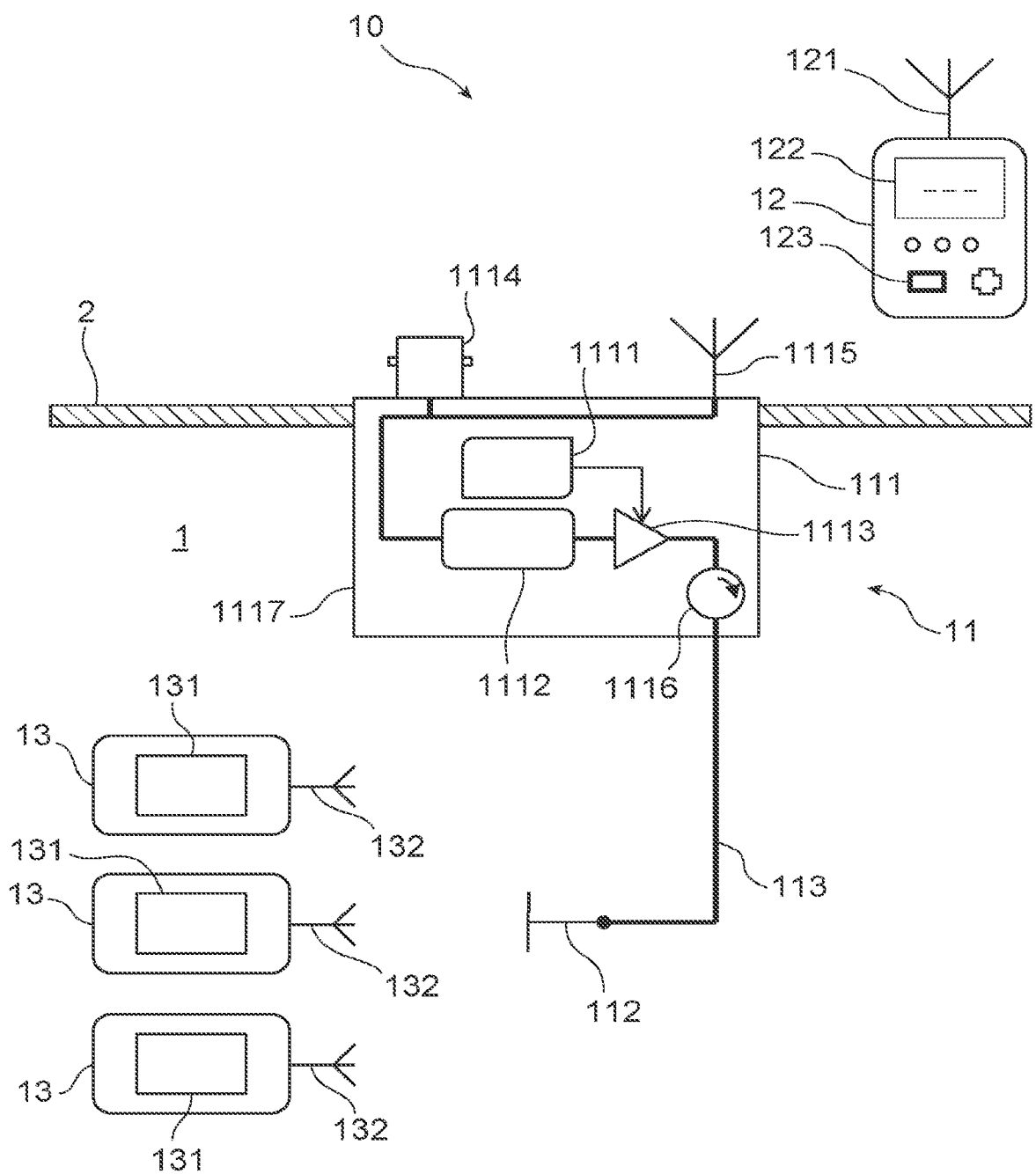
FIG. 1 schematically shows a first example of an assembly for verifying turbojet engine parts according to the invention.

FIG. 1 schematically shows a first example of an assembly for verifying turbojet engine parts according to the invention. The turbojet engine, not shown, comprises a set of parts and/or components located in a nacelle compartment 1. This compartment is delimited by a nacelle wall 2 typically formed by a composite multilayer structure. The verification assembly 10 includes a verification system 11, an interrogator device 12 and three RFID tags. Each RFID tag 13 is intended to be associated with a part or a component of the turbojet engine. It is for example glued, welded or attached to the part or to the component. It comprises an electronic chip 131 containing information relative to the part or to the component to which it is associated and an antenna 132. The information relative to the part or the component includes, for example, an identification of the part, its lifetime or the fact that it contains one or several dangerous or toxic substances.

The verification system 11 comprises an interface device 111, an inner antenna 112 and a coaxial cable 113 connecting the interface device 111 to the inner antenna 112. The interface device 111 includes an authorisation module 1111, a conversion unit 1112, a repeater amplifier 1113, a BNC connector 1114, an outer antenna 1115 and a circulator 1116. The authorisation module 1111, the conversion unit 1112, the repeater amplifier 1113 and the circulator 1116 are accommodated in a casing 1117 located at least partially in the nacelle compartment 1. The conversion unit 1112 is connected between, on the one hand, the BNC connector 1114 and the outer antenna 1115 and, on the other hand, the repeater amplifier 1113. It is arranged to convert a signal in a first communication protocol into a signal in a second communication protocol, and conversely. The first communication protocol is compatible with the interrogator device 12. It consists for example of a Wi-Fi protocol. The second communication protocol is an RFID communication protocol compatible with the RFID tags 13. The conversion unit 1112 is thus arranged to convert a Wi-Fi interrogation signal into an RFID interrogation signal and to convert an RFID response signal into a Wi-Fi response signal. The repeater amplifier 1113 is connected between the conversion unit 1112 and the circulator 1116. It allows the interrogation signal to be amplified at the output of the conversion unit such that the inner antenna 112 emits an RFID signal strong enough to reach the set of RFID tags 13. The circulator 1116 is connected between the repeater amplifier 1113 and the inner antenna 112. It allows all response signals originating from the inner antenna 112 to circumvent the repeater amplifier 1113 and be injected directly into the conversion unit 1112. The authorisation module 1111 is arranged to receive an engine status information and prevent or authorise the emission of a RF interrogation signal according to this information. The engine status information is relative to the switched on or switched off state of the turbojet engine. It originates for example from a full authority digital engine control (FADEC). In this embodiment, the authorisation module 1111 pilots the repeater amplifier 1113 such as to prevent the emission of any RF interrogation signal by the inner antenna 112 when the turbojet engine is switched on and to amplify an RF interrogation signal when the turbojet engine is switched off. The BNC connector 1114 and the outer antenna 1115 are mounted on the casing 1117, such as to open onto the outside of the nacelle compartment 1. They form access points of the interface device 111, namely respectively a wire access point and a wireless access point. The inner antenna 112 is located in the nacelle compartment 1, such as to be able to communicate with the RFID tags 13 without having to cross the nacelle wall 2. It is for example mounted on an inner surface of the nacelle wall 2. In the example of FIG. 1, the inner antenna 112 is a dipole antenna. Nevertheless, any type of antenna capable of emitting and receiving radiofrequency signals (RF) compatible with an RFID communication protocol can be used.

The interrogator device 12, also called «RFID reader», comprises a wireless communication module equipped with an antenna 121 and arranged to communicate with the verification system 11 via its outer antenna 1115. The communication module is arranged to communicate with the verification system 11 according to the first communication protocol, namely a Wi-Fi protocol in this embodiment. The interrogator device 12 could also include a BNC connector able to be connected to the BNC connector 1114 of the interface device 111, for example by means of a coaxial cable. The interrogator device 12 is arranged to emit an interrogation signal to the RFID tags 13, such as to initiate the emission, by each RFID tag 13 having received this signal, of a response signal encoding information contained in its electronic chip 131. The interrogator device 12 also includes a display 122, controlling buttons 123 and a battery, not shown. The display 122 allows the information gathered in the RFID tags 13 to be displayed. The controlling buttons 123 allow controlling the interrogator device 12. In particular, a button allows the emission of an interrogation signal to be initiated by the antenna 121. The battery is arranged to be able to supply the different elements of the interrogator device 12 and make it autonomous.

It is worth noting that the interface device 111 could include a plurality of inner antennas, these antennas being located in different positions inside the nacelle compartment 1 in order to reach the different RFID tags 13 distributed in the turbojet engine. Furthermore, it has been considered, in the embodiment example of FIG. 1, that the interrogator device 12 operated with a communication protocol other than an RFID communication protocol. The interrogator device 12 could however operate with this protocol, rendering useless the presence of the conversion unit 1112. The repeater amplifier 1113 and the circulator 1116 could also be removed, in particular when the interrogation signal is injected into the interface device 111 by the BNC connector 1114. In this case, the strength of this signal can be sufficient enough to reach all the RFID tags 13. The authorisation module 1111 can also be removed, in particular when the interrogation signal is injected in the interface device 111 by the BNC connector 1114 as operators are only authorised to approach the turbojet engine when it is switched off.

Figure 2:
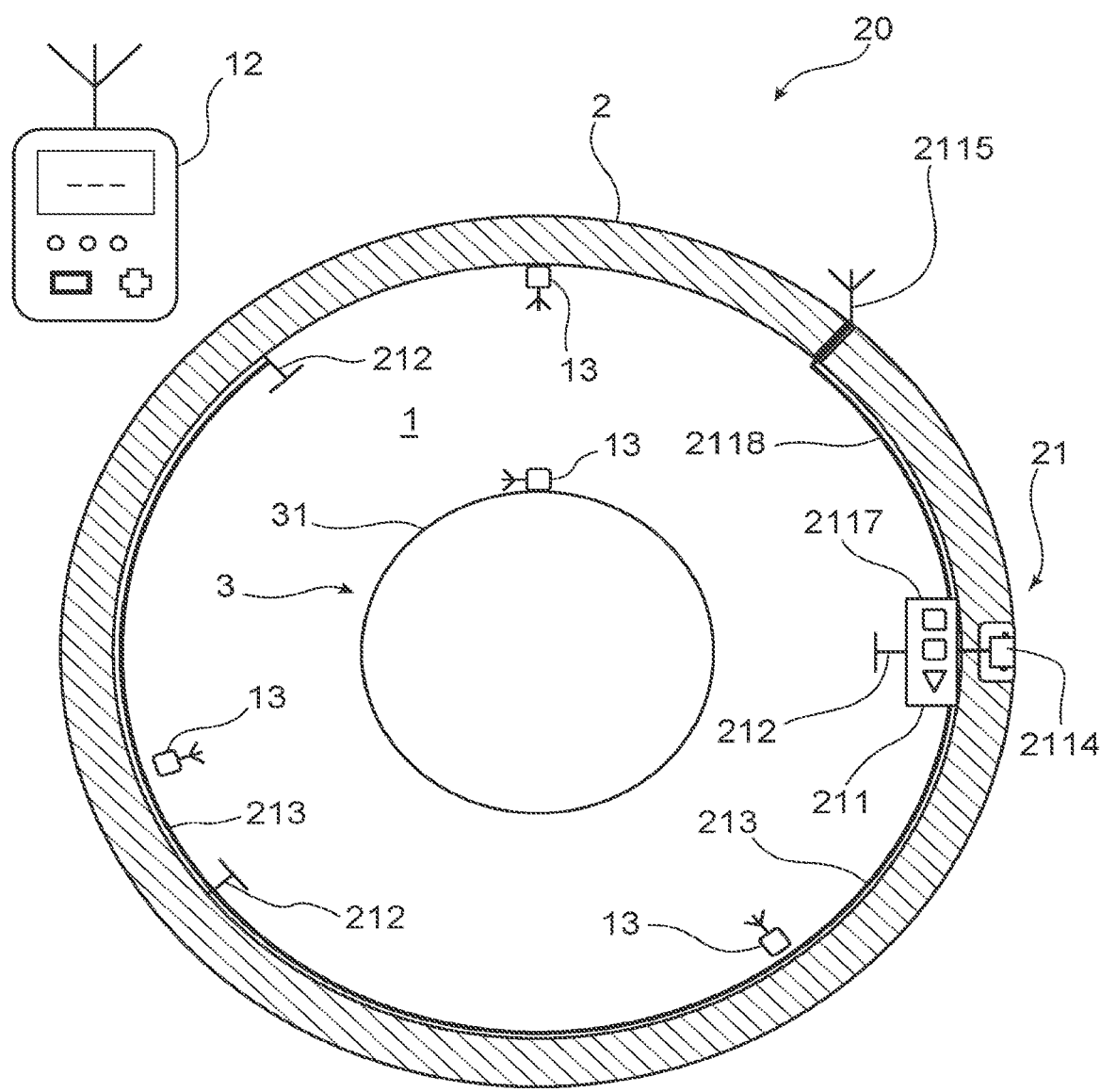
FIG. 2 schematically shows, in a cross-sectional view, an aircraft turbojet engine equipped with a second example of an assembly for verifying parts according to the invention.

FIG. 2 schematically shows, in a cross-sectional view, an aircraft turbojet engine 3 equipped with a second example of an assembly for verifying parts according to the invention. The turbojet engine 3 includes a core 31 formed by an assembly of parts and/or components located in a nacelle compartment 1 delimited by a nacelle wall 2. The verification assembly 20 includes a verification system 21, an interrogator device 12 and four RFID tags 13. The interrogator device 12 and the RFID tags 13 are identical to those of FIG. 1. The verification system 21 comprises an interface device 211, three inner antennas 212 and coaxial cables 213 connecting the inner antennas 212 to the interface device 211. The interface device 211 is identical to the interface device 111 described with reference to FIG. 1. It is distinguished from it in that it includes a BNC connector 2114 accommodated in the thickness of the nacelle wall 2 and an outer antenna 2115 remote from the casing 2117 and connected thereto by a coaxial cable 2118, preferably reinforced.

The examples of assembly for verifying turbojet engine parts according to the invention can operate in the following manner. In a first step, a user actuates a controlling button of the interrogator device 12 in order to emit an interrogator signal. This interrogator signal is received by the outer antenna 1115, 2115, processed by the interface device 111, 211 and re-emitted by each inner antenna 112, 212. Each RFID tag 13 that receives this interrogation signal sends back a response signal containing information relative to the part of the turbojet engine it equips. This response signal is received by at least one inner antenna 112, 211 possibly converted by the conversion unit 1112 of the interface device 111, 211 and re-emitted by the outer antenna 1115, 2115. The response signal is then received by the interrogator device 12 in order to extract from it the information coming from RFID tags 13.

The invention claimed is:

1. A verification system for verifying turbojet engine parts in a turbojet engine accommodated in a nacelle compartment delimited by a nacelle wall and including at least one part equipped with an RFID tag, the verification system comprising:
   an inner antenna accommodated in the nacelle compartment, the inner antenna being arranged to allow the exchange of radiofrequency signals with the RFID tag,
   an interface device including an access point located outside the nacelle compartment, the interface device being arranged to be able to be connected to an interrogator device arranged to communicate with the RFID tag, and
   a transmission line connecting the interface device to the inner antenna so that an interrogator signal from the interrogator device that is processed by the interface device is re-emitted by the inner antenna to the RFID tag, and a response signal sent by the RFID tag receiving the interrogator signal is received by the inner antenna and re-emitted by the interface device to the interrogator device.

2. The verification system according to claim 1, wherein the access point of the interface device comprises a coaxial connector.

3. The verification system according to claim 1, wherein the access point of the interface device comprises an outer antenna.

4. The verification system according to claim 3, wherein the interface device further comprises a conversion unit connected between the outer antenna and the inner antenna and arranged to convert a signal in a first communication protocol into a signal in a second communication protocol, and conversely, the first communication protocol being compatible with the interrogator device and the second communication protocol being compatible with the RFID tag.

5. The verification system according to claim 3, further comprising a relay antenna installed on a ground, arranged to transmit radiofrequency signals originating from an interrogator device to the outer antenna of the interface device, and reciprocally.

6. The verification system according to claim 1, wherein the interface device further includes a bidirectional repeater amplifier connected between the outer antenna and the inner antenna.

7. The verification system according to claim 1, wherein the interface device further includes an authorisation module arranged to receive engine status information regarding a switched on or a switched off state of the turbojet engine and prevent or authorise the emission of a radiofrequency interrogation signal by the inner antenna according to said engine status information.

8. The verification system according to claim 1, wherein the RFID tag contains at least one of information regarding an identification of the part that the RFID tag equips, information regarding a lifetime of said part, and information regarding a presence of a predetermined substance in said part.

9. The verification system according to claim 1 wherein the nacelle wall includes a fan cowl and a core cowl, and the access point of the interface device is mounted on the fan cowl or the core cowl.

10. The verification system according to claim 1, comprising a plurality of inner antennas accommodated in the nacelle compartment and a plurality of transmission lines, the transmission lines connecting the interface device to each inner antenna.

11. An assembly for verifying turbojet engine parts comprising:
a verification system according to claim 1,
an RFID tag able to equip a part of a turbojet engine, and
an interrogator device arranged to communicate with the RFID tag via the verification system.

12. An aircraft turbojet engine arranged to be accommodated in a nacelle compartment delimited by a nacelle wall, the turbojet engine comprising:
a verification system according to claim 1, and
an RFID tag equipping a turbojet engine part.

* * * * *